(12) United States Patent
Patwardhan

(10) Patent No.: US 8,595,271 B1
(45) Date of Patent: Nov. 26, 2013

(54) SYSTEMS AND METHODS FOR PERFORMING FILE SYSTEM CHECKS

(75) Inventor: Kedar Patwardhan, Pune (IN)

(73) Assignee: Symantec Corporation, Mountain View, CA (US)

( * ) Notice: Subject to any disclaimer, the term of this patent is extended or adjusted under 35 U.S.C. 154(b) by 414 days.

(21) Appl. No.: 12/969,103

(22) Filed: Dec. 15, 2010

(51) Int. Cl.
*G06F 17/00* (2006.01)

(52) U.S. Cl.
USPC ........... 707/821; 707/609; 707/790; 707/899; 707/687

(58) Field of Classification Search
USPC ............... 707/609, 687, 790, 813, 821, 899
See application file for complete search history.

(56) References Cited

U.S. PATENT DOCUMENTS 8,312,548 B1 * 11/2012 Cnudde et al. .................. 726/24
2006/0282471 A1 * 12/2006 Mark et al. ..................... 707/200

* cited by examiner

*Primary Examiner* — Sana Al Hashemi
(74) *Attorney, Agent, or Firm* — ALG Intellectual Property, LLC

(57) ABSTRACT

A computer-implemented method for performing file system checks may include identifying a file system to check. The computer-implemented method may also include identifying a base log including file system metadata within the file system at a previous time. The computer-implemented method may further include identifying a set of changed inodes within the file system since the previous time. The computer-implemented method may additionally include creating an updated log based on the base log and the set of changed inodes. The computer-implemented method may also include checking the updated log for consistency. Various other methods, systems, and computer-readable media are also disclosed.

20 Claims, 6 Drawing Sheets

SYSTEMS AND METHODS FOR PERFORMING FILE SYSTEM CHECKS

BACKGROUND

Consumers and organizations increasingly rely on digitally-stored data. As the cost of digital data storage decreases and the reliance on digitally-stored data increases, file systems may manage ever greater amounts of data.

In order to maintain the integrity of stored data, many file systems regularly check the consistency of metadata used to organize data stored within the file systems. An error in this metadata may not only interfere with access to a corresponding file or directory, it may also sometimes undermine assumptions under which a file system operates, potentially leading to further data loss and corruption of the file system.

Unfortunately, fully checking the consistency of a large file system may take a long time and consume substantial computing resources. Accordingly, the instant disclosure identifies a need for additional and improved systems and methods for performing file system checks.

SUMMARY

As will be described in greater detail below, the instant disclosure generally relates to systems and methods for performing file system checks. Systems and methods described herein may incrementally validate file system metadata by only checking portions of file system metadata that reflect a change since the last file system check. For example, a method may include identifying a file system to check, identifying a base log including file system metadata within the file system at a previous time, identifying a set of changed inodes within the file system since the previous time, creating an updated log based on the base log and the set of changed inodes, and checking the updated log for consistency.

In some contexts (e.g., before an incremental file system check has been performed), identifying the base log may entail creating the base log by performing a full file system check on the file system. In subsequent contexts, the updated log may be used as a base log (e.g., for the next incremental file system check). The set of changed inodes may include inodes that experienced any of a variety of changes, such as an inode modified since the previous time, an inode added since the previous time, and/or an inode deleted since the previous time.

The systems described herein may create the updated log with any of a variety of steps. For example, these systems may replace an inode in the base log with a modified version of the inode in the set of changed nodes. Additionally or alternatively, these systems may add a new inode to the base log from the set of changed inodes.

Checking the updated log for consistency may include any of a variety of steps. For example, the systems described herein may check whether each directory inode in the set of changed inodes is valid, check whether a link count for each inode in the set of changed inodes is valid, and/or check for at least one duplicate allocation caused by the set of changed inodes. In some examples, these systems may check for the duplicate allocation by identifying at least one block within the file system that is shared by more than one inode within the set of changed inodes. Additionally or alternatively, these systems may check for the duplicate allocation by identifying at least one block within the file system that is used by a file of an inode within the set of changed inodes and marked as allocated within the base log.

In some examples, the base log may also include structural metadata of the file system at the previous time. In these examples, creating the updated log may include identifying the current structural metadata of the file system and including the current structural metadata of the file system in the updated log. Additionally, in these examples, checking the updated log may include checking whether the current structural metadata is valid.

The systems described herein may also fix at least one inconsistency of the file system based on the check of the updated log. For example, these systems may remove a file corresponding to a new inode in the set of changed inodes that caused the inconsistency. Additionally or alternatively, these systems may restore the file system from the base log.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
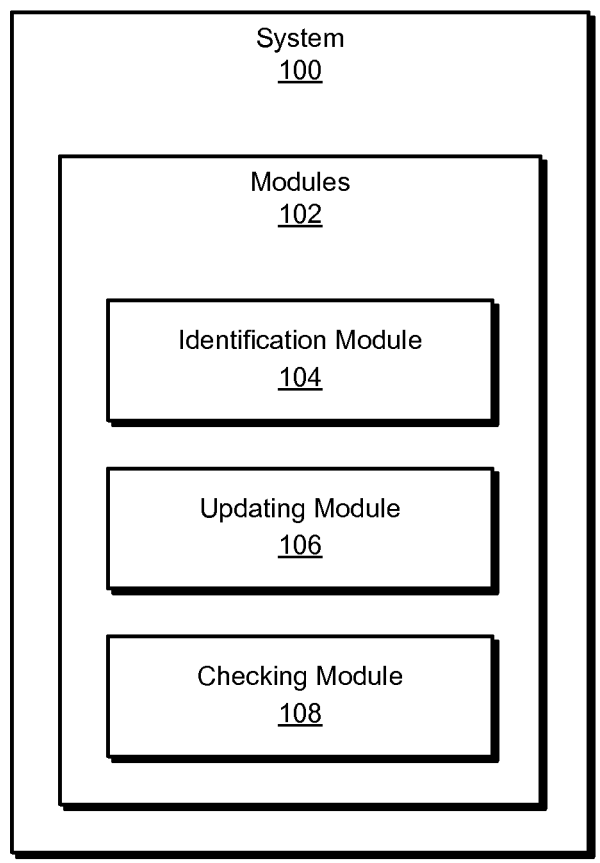
FIG. 1 is a block diagram of an exemplary system for performing file system checks.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for performing file system checks. Systems and methods described herein may incrementally validate file system metadata by only checking portions of file system metadata that reflect a change since the last file system check. By performing only incremental checks to validate the integrity of a file system based on changes made to the file system metadata, these systems and methods may reduce the time required to perform a file system check. In some contexts, this may allow more frequent file system checks, potentially preventing corruption spreading through the file system. In some examples, the size of the file system may continuously grow (e.g., at a linear rate), but the costs (e.g., in time and/or computing resources) for checking the file system may remain constant.

Figure 2:
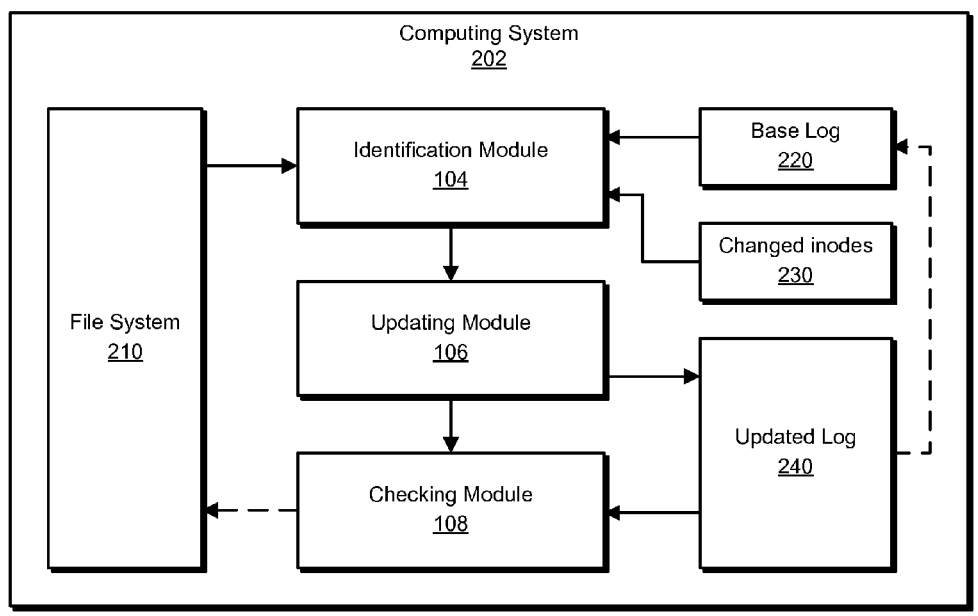
FIG. 2 is a block diagram of another exemplary system for performing file system checks.

The following will provide, with reference to FIGS. 1-2, detailed descriptions of exemplary systems for performing file system checks. Detailed descriptions of corresponding computer-implemented methods will also be provided in connection with FIG. 3. Detailed descriptions of an exemplary timeline will be provided in connection with FIG. 4. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for performing file system checks. As illustrated in this figure, exemplary system 100 may include one or more modules 102 for performing one or more tasks. For example, and as will be explained in greater detail below, exemplary system 100 may include an identification module 104 programmed to identify a file system check, identify a base log including file system metadata within the file system at a previous time, and identify a set of changed inodes within the file system since the previous time. Exemplary system 100 may also include an updating module 106 programmed to create an updated log based on the base log and the set of changed inodes.

In addition, and as will be described in greater detail below, exemplary system 100 may include a checking module 108 programmed to check the updated log for consistency. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, as will be described in greater detail below, one or more of modules 102 may represent software modules stored and configured to run on one or more computing devices, such as computing system 202 illustrated in FIG. 2, computing system 510 in FIG. 5, and/or portions of exemplary network architecture 600 in FIG. 6. One or more of modules 102 in FIG. 1 may also represent all or portions of one or more special-purpose computers configured to perform one or more tasks.

Exemplary system 100 in FIG. 1 may be deployed in a variety of ways. For example, all or a portion of exemplary system 100 may represent portions of exemplary system 200 illustrated in FIG. 2. As shown in FIG. 2, system 200 may include a computing system 202 with a file system 210 to be checked. In one embodiment, and as will be described in greater detail below, computing system 202 may include identification module 104, updating module 106, and checking module 108.

Identification module 104 may be programmed to identify file system 210 for checking. Identification module 104 may also be programmed to identify a base log 220 including file system metadata within file system 210 at a previous time. Identification module 104 may additionally be programmed to identify changed inodes 230 since the previous time. Updating module 106 may be programmed to create an updated log 240 based on base log 220 and changed inodes 230. Checking module 108 may be programmed to check updated log 240 for consistency.

Computing system 202 generally represents any type or form of computing device capable of reading computer-executable instructions. Examples of computing system 202 include, without limitation, laptops, desktops, servers, cellular phones, personal digital assistants (PDAs), multimedia players, embedded systems, combinations of one or more of the same, exemplary computing system 510 in FIG. 5, or any other suitable computing device.

Figure 3:
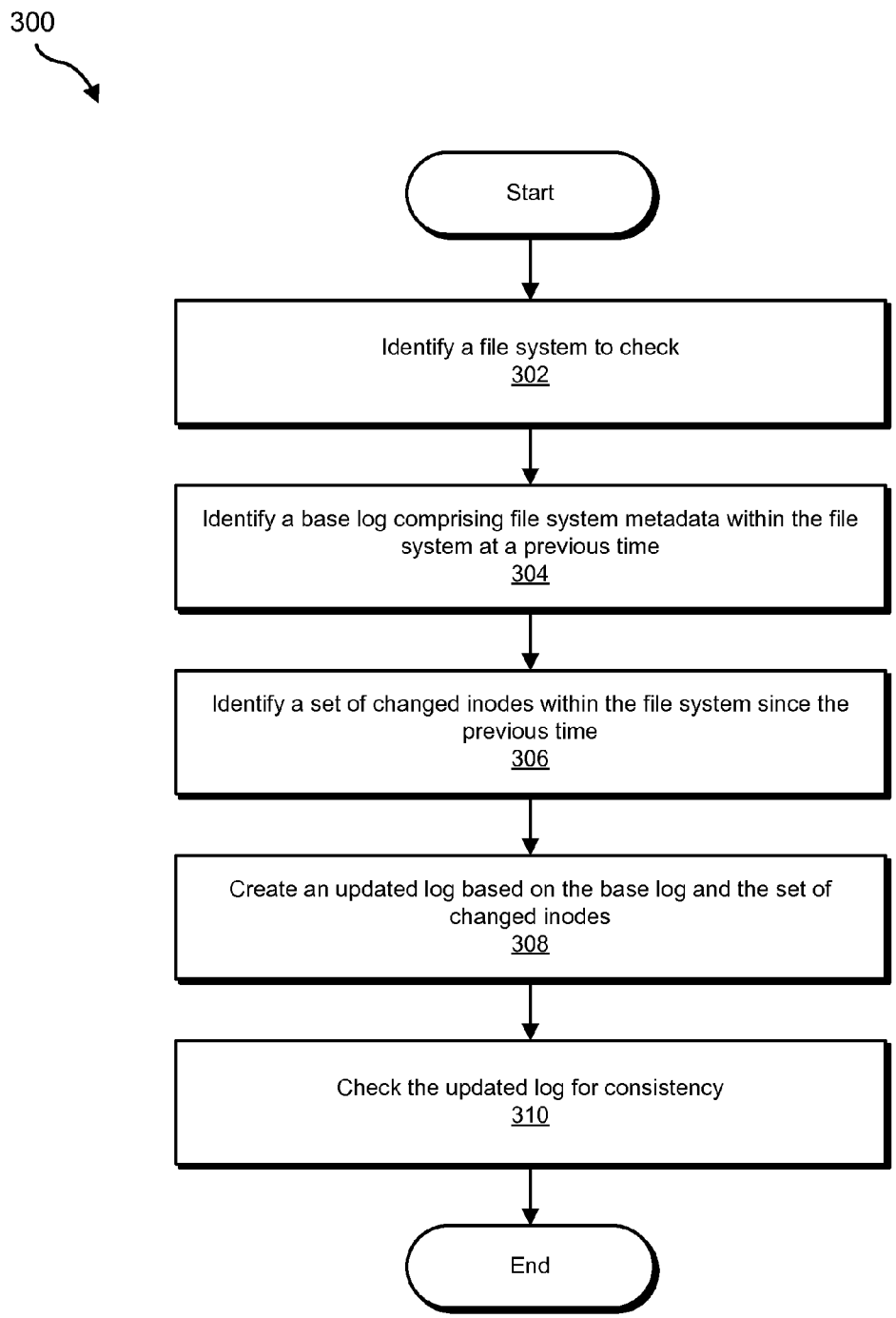
FIG. 3 is a flow diagram of an exemplary method for performing file system checks.

FIG. 3 is a flow diagram of an exemplary computer-implemented method 300 for performing file system checks. The steps shown in FIG. 3 may be performed by any suitable computer-executable code and/or computing system. In some embodiments, the steps shown in FIG. 3 may be performed by one or more of the components of system 100 in FIG. 1 and/or system 200 in FIG. 2.

As illustrated in FIG. 3, at step 302 one or more of the systems described herein may identify a file system to check. For example, at step 302 identification module 104 may, as part of computing system 202, identify file system 210.

As used herein, the phrase "file system" may refer to any system for organizing, managing, and/or storing files and/or other data objects. Additionally, as used herein, the term "check" as applied to a file system may refer to any method for evaluating the consistency of the file system.

Identification module 104 may perform step 302 in a variety of contexts. For example, identification module 104 may determine that the file system requires a check after an improper shutdown of the file system (e.g., due to an unexpected halt of an operating system managing the file system, due to a loss of power to a computer system running the file system, etc.). Additionally or alternatively, identification module 104 may determine that the file system requires a check by determining that the file system failed to fully synchronize and/or quiesce. In some examples, identification module 104 may determine that the file system requires a check by identifying a hardware failure (e.g., a failure of a storage medium, a disk controller, etc.). In some additional examples, identification module 104 may determine that the file system requires a check by determining that a certain amount of time has passed since the most recent check (e.g., identification module 104 may be configured to identify the file system for a daily check). Additionally or alternatively, identification module 104 may identify a user-initiated request to check the file system.

Identification module 104 may perform step 302 in a variety of ways. For example, identification module 104 may identify the file system by reading a configuration file that identifies the file system. Additionally or alternatively, identification module 104 may identify the file system by receiving a message that identifies the file system (e.g., from a daemon or an application). In some examples, identification module 104 may identify the file system simply by operating within the context of the file system.

At step 304 one or more of the systems described herein may identify a base log including file system metadata within the file system at a previous time. For example, at step 304 identification module 104 may, as part of computing system 202, identify base log 220.

As used herein, "file system metadata" may refer to any metadata used in the operation and/or organization of a file system, such as structural metadata and/or inode data. As used herein, the term "inode data" may refer to any metadata used by a file system to organize, manage, and/or locate data within the file system. Likewise, the term "inode" may refer to a data structure containing inode data (e.g., corresponding to a single file or directory). For example, "inode data" may refer to data within an inode (e.g., of a UNIX-type file system), data within a vnode, stat data, etc. Examples of inodes include regular file inodes, directory inodes, symbolic link inodes, and socket inodes.

As mentioned above, the base log may include inode data as it was within the file system at a previous time. In some examples, the previous time may represent a time of a previous file system check. As will be explained in greater detail below, the systems described herein may perform incremental checks, each incremental check using the state of the file system at the time of the previous check as a base.

In some contexts, identifying the base log may entail creating the base log. For example, the base log may not yet exist if no file system check has previously been performed. Accordingly, identification module 104 may create the base log by performing a full file system check on the file system and populating the base log with inode data representing the state of the file system. Additionally or alternatively, identification module 104 may create the base log by culling inode data from a file system without checking the file system. For example, identification module 104 may assume that the file system is perfectly consistent because the file system is in an initial, verified state. Generally, the base log may include inode data of the file system in a consistent state.

Figure 4:
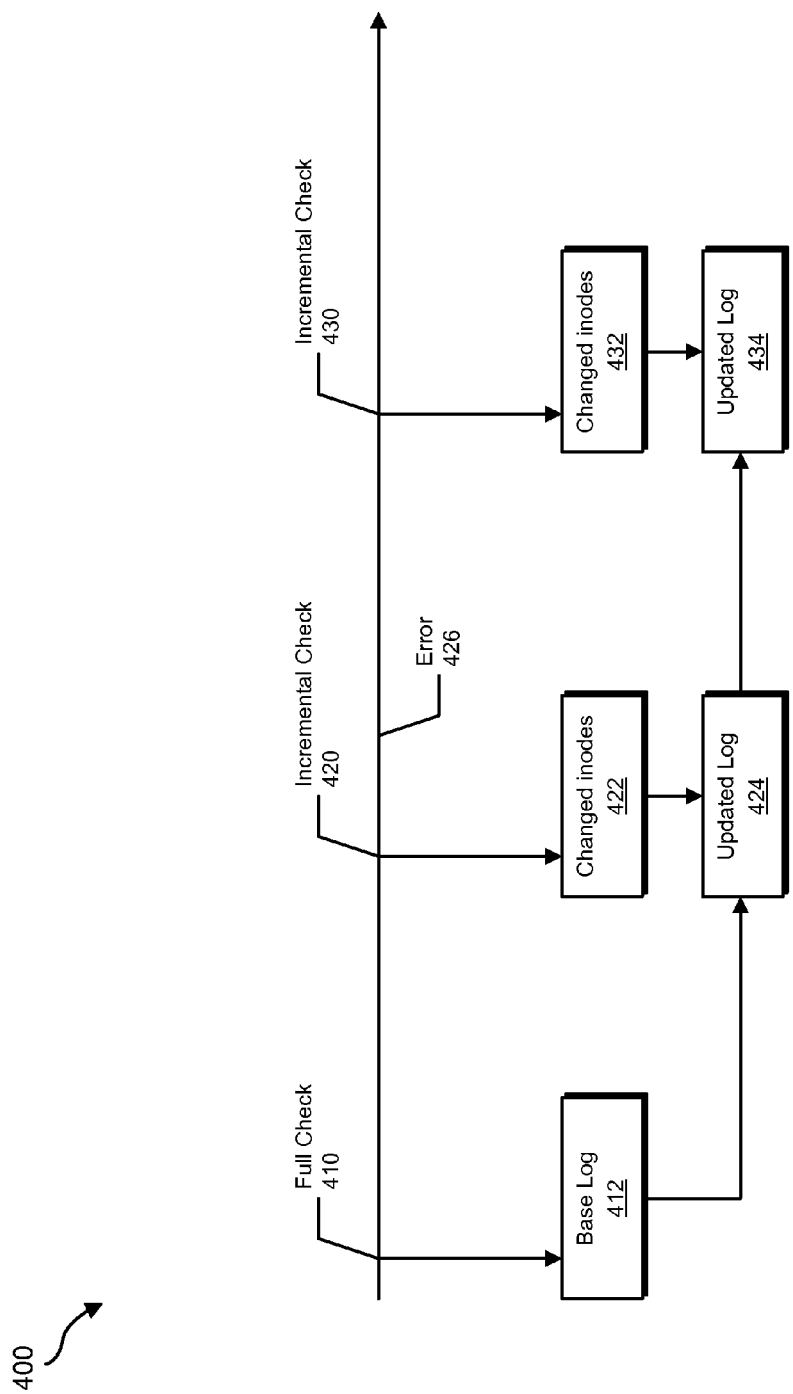
FIG. 4 is a diagram of an exemplary timeline for performing file system checks.

FIG. 4 is an illustration of an exemplary timeline 400 of one or more of the systems or methods described herein. As shown in FIG. 4, identification module 104 may perform a full check 410 and create a corresponding base log 412 that includes the inode data of the file system at the time of the full check 410.

Returning to step 304, in some examples the base log may additionally include structural metadata of the file system at the previous time. As used herein, the phrase "structural metadata" may include any metadata pertaining to the structure of the file system beyond inode data. Examples of structural metadata may include pointers to inodes, locations of block maps within the file system, metadata used for bootstrapping the file system, etc.

Returning to FIG. 3, at step 306 one or more of the systems described herein may identify a set of changed inodes within the file system since the previous time. For example, at step 306 identification module 104 may, as part of computing system 202, identify changed inodes 230. Using FIG. 4 as an example, at the time of an incremental check 430, identification module 104 may identify changed inodes 432 since the time of an incremental check 420.

The set of changed inodes may include inodes representing any of a variety of changes. For example, the set of changed inodes may include an inode modified since the previous time. As an example, the pointer structure of the inode may have been modified since the previous time (e.g., due to a change to a file corresponding to the inode). In another example, the set of changed inodes may include an inode added since the previous time. For example, a new file corresponding to the inode may have been added since the previous time. In an additional example, the set of changed inodes may include an inode deleted since the previous time. For example, a file corresponding to the inode may have been deleted from the file system since the previous time.

Identification module 104 may perform step 306 in a variety of ways. For example, identification module 104 may identify the set of changed inodes by monitoring the file system for changes to inodes. For example, identification module 104 may include a portion of a file system driver and observe and record each change made to the inodes of the file system between file system checks. In some examples, identification module 104 may only record sufficient information to identify each changed inode, such as an inode number.

Identification module 104 may then identify the set of changed inodes by looking up each recorded inode number. Additionally or alternatively, identification module 104 may only record a change to an inode once (e.g., identification module 104 may mark that the inode has changed since the previous time rather than recording each change to the inode).

In another example, identification module 104 may identify the set of changed inodes by breaking a mirror from a volume of the file system. Identification module 104 may then identify all inodes within the mirror changed since the previous time. Afterwards, identification module 104 may merge the mirror to mirror the volume again. In some examples, identification module 104 may identify the set of changed inodes by using a snapshot configured to record changed inode numbers. In these examples, identification module 104 may subsequently freeze the file system to read the changed inodes and/or break the mirror as mentioned above to read the changed inodes.

Returning to FIG. 3, at step 308 one or more of the systems described herein may create an updated log based on the base log and the set of changed inodes. For example, at step 308 updating module 106 may, as part of computing system 202, create updated log 240 based on base log 220 and changed inodes 230. Using FIG. 4 as an example, at the time of an incremental check 430, updating module 106 may create updated log 434 based on an updated log 424 (used, e.g., as a new base log) and changed inodes 432.

Updating module 106 may create the updated log in a variety of ways. In some examples, updating module 106 may use the base log (or a copy of the base log) as a base for updates. For example, updating module 106 may replace an inode in the base log with a modified version of the inode in the set of changed inodes (e.g., by overwriting the inode with the modified version or by overwriting portions of the inode with the modified portions of the modified version). Additionally or alternatively, updating module 106 may add a new inode from the set of changed inodes to the base log.

As was mentioned earlier, in some examples the systems described herein may perform incremental checks on the file system. In order to accomplish this task, these systems may maintain a base log current as of the most recent file system check. Accordingly, the updated log created by updating module 106 may be used as a base log for a subsequent check. Additionally, as will be described in greater detail below, since these systems may use the base log to repair the file system, updating module 106 may maintain a copy of the base log in addition to creating the updated log until the file system has been checked and, if necessary, repaired. Updating module 106 may then remove the old base log and use the updated log as a new base log.

Additionally, as was mentioned earlier, in some examples the base log may include structural metadata from the file system at the previous time. In these examples, creating the updated log may include identifying current structural metadata of the file system and including the current structural metadata in the updated log. As described earlier, the structural metadata may include a variety of information, such as pointers to inodes, locations of block maps within the file system, metadata used for bootstrapping the file system, etc.

Returning to FIG. 3, at step 310 one or more of the systems described herein may check the updated log for consistency. For example, at step 310 checking module 108 may, as part of computing system 202, check updated log 240 for consistency. Using FIG. 4 as an example, at the time of an incremental check 430, checking module 108 may check updated log 434 for consistency. As used herein, the term "consistency" may refer to any characteristic of a file system relating to its consistency, validity, sanity, and/or usability.

Checking module 108 may check a variety of aspects of the updated log in order to check the updated log for consistency. For example, checking module 108 may check whether each directory inode in the set of changed inodes is valid within the context of the updated log. For example, checking module 108 may check whether a directory inode points to an unallocated inode, whether an inode number of a directory inode is greater than the number of inodes within the file system, whether relative directories (e.g., "." and "..") have the correct inode numbers, whether a directory has a hole (e.g., an unallocated block), whether a directory is linked into the file system, etc.

Checking module 108 may also check for duplicate allocations caused by the set of changed inodes. For example, checking module 108 may check for any block within the file system that is shared by more than one inode within the set of changed inodes. Additionally or alternatively, checking module 108 may check for any block within the file system that is used by a file of an inode within the set of changed inodes and marked as allocated within the base log. For example, the base log may include an allocation bitmap. Checking module 108 may also revise the allocation bitmap and/or exclude any files or file blocks that were deallocated and/or deleted since the previous time from consideration when checking the allocation bitmap.

Checking module 108 may additionally check whether a link count for each inode in the set of changed inodes is valid. Checking module 108 may also check whether the linkages for each inode in the set of changed inodes are valid. In some examples, checking module 108 may only check inodes within the set of changed inodes that were added to the file system since the previous time. For example, checking module 108 may identify all new directory inodes and other linking inodes within the set of change inodes. Checking module 108 may then count how many times each new inode in the set of changed inodes is linked by one of the directory inodes or other linking inodes.

As mentioned earlier, the updated log may also include current structural metadata of the file system. Accordingly, in some examples, checking module 108 may also check whether the current structural metadata is valid. For example, checking module 108 may check whether the file system size is larger than the reported number of blocks used by the structural metadata and the inodes of the file system, whether the block maps within the structural metadata are valid, etc. After step 310, method 300 may terminate.

The systems and methods described herein may also fix one or more inconsistencies of the file system based on the check of the updated log. For example, these systems may remove a file corresponding to a new inode in the set of changed inodes that caused the inconsistency. These systems may also generally perform any other suitable repair to the file system as may be performed by traditional file system checking technologies upon discovery of an inconsistency. In some examples, these systems may determine that vital structural metadata is lost or irreparably corrupted. In these examples, these systems may restore the metadata from the base log, tolerating the loss of files added since the previous time in order to salvage the file system.

Using FIG. 4 as an example, at incremental check 420 the systems described herein may create updated log 424 of the file system. Subsequent to incremental check 420, an error 426 may introduce an inconsistency into the file system. If error 426 includes an irreparable change to the structural metadata of the file system, the systems described herein may restore the structural metadata from updated log 424. If error 426 includes a change to an inode within the file system, the systems described herein may locate the inconsistency caused by the error by checking changed inodes 432 in the context of updated log 434. These systems may then fix the inconsistency.

By performing only incremental checks to validate the integrity of a file system based on changes made to the file system metadata, these systems and methods may reduce the time required to perform a file system check. In some contexts, this may allow more frequent file system checks, potentially preventing corruption spreading through the file system. In some examples, the size of the file system may continuously grow (e.g., at a linear rate), but the costs (e.g., in time and/or computing resources) for checking the file system may remain constant.

Figure 5:
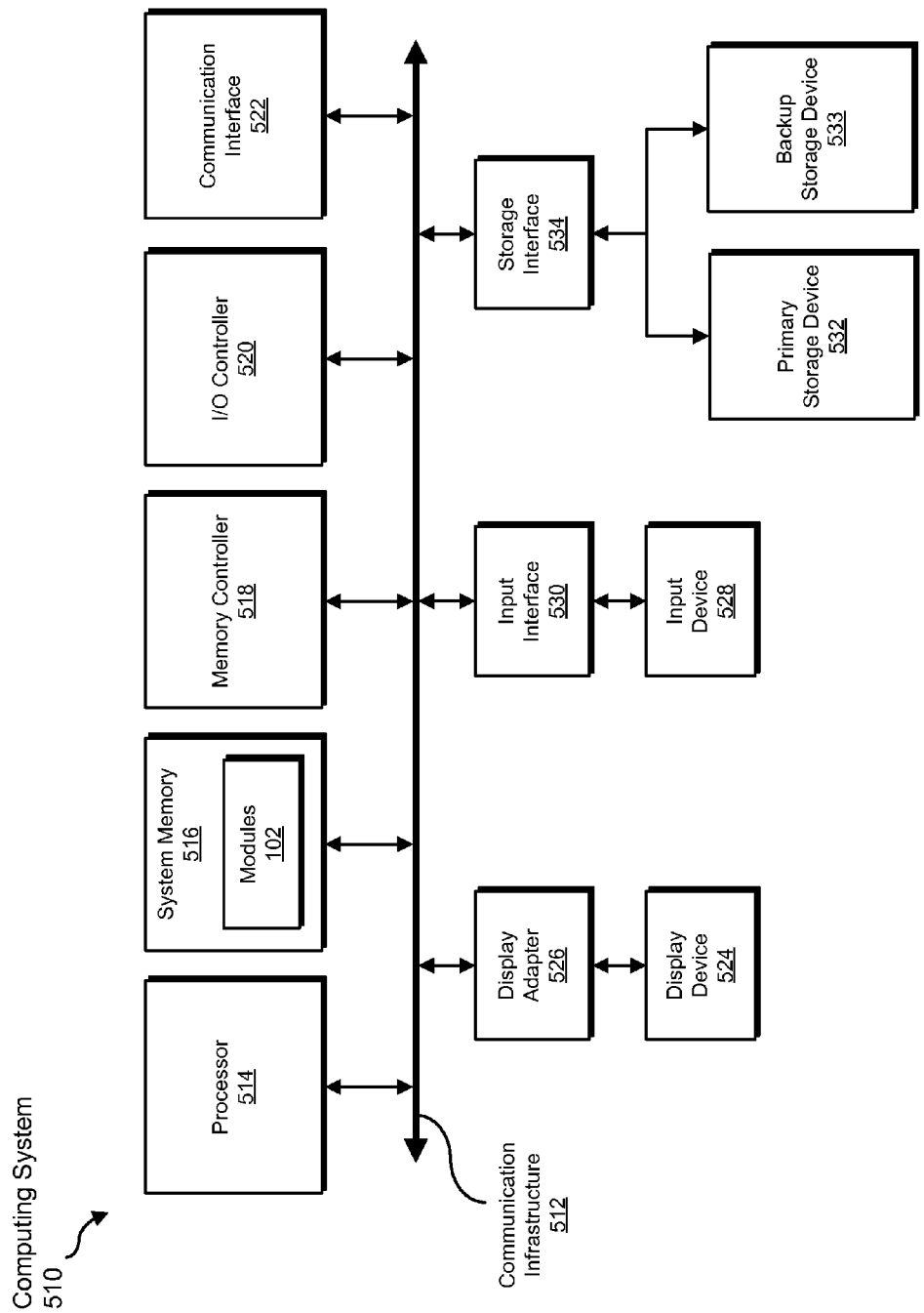
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein. For example, processor 514 may perform and/or be a means for performing, either alone or in combination with other elements, one or more of the identifying, creating, replacing, adding, including, checking, fixing, removing, and/or restoring steps described herein. Processor 514 may also perform and/or be a means for performing any other steps, methods, or processes described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an input/output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an ISA, PCI, PCIe, or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512. In certain embodiments, memory controller 518 may perform and/or be a means for performing, either alone or in combination with other elements, one or more of the steps or features described and/or illustrated herein, such as identifying, creating, replacing, adding, including, checking, fixing, removing, and/or restoring.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534. I/O controller 520 may be used, for example, to perform and/or be a means for performing, either alone or in combination with other elements, one or more of the identifying, creating, replacing, adding, including, checking, fixing, removing, and/or restoring steps described herein. I/O controller 520 may also be used to perform and/or be a means for performing other steps and features set forth in the instant disclosure.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution. In certain embodiments, communication interface 522 may perform and/or be a means for performing, either alone or in combination with other elements, one or more of the identifying, creating, replacing, adding, including, checking, fixing, removing, and/or restoring steps disclosed herein. Communication interface 522 may also be used to perform and/or be a means for performing other steps and features set forth in the instant disclosure.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device. In at least one embodiment, input device 528 may perform and/or be a means for performing, either alone or in combination with other elements, one or more of the identifying, creating, replacing, adding, including, checking, fixing, removing, and/or restoring steps disclosed herein. Input device 528 may also be used to perform and/or be a means for performing other steps and features set forth in the instant disclosure.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a floppy disk drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

In certain embodiments, storage devices 532 and 533 may be used, for example, to perform and/or be a means for performing, either alone or in combination with other elements, one or more of the identifying, creating, replacing, adding, including, checking, fixing, removing, and/or restoring steps disclosed herein. Storage devices 532 and 533 may also be used to perform and/or be a means for performing other steps and features set forth in the instant disclosure.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an application specific integrated circuit (ASIC) adapted to implement one or more of the exemplary embodiments disclosed herein.

Figure 6:
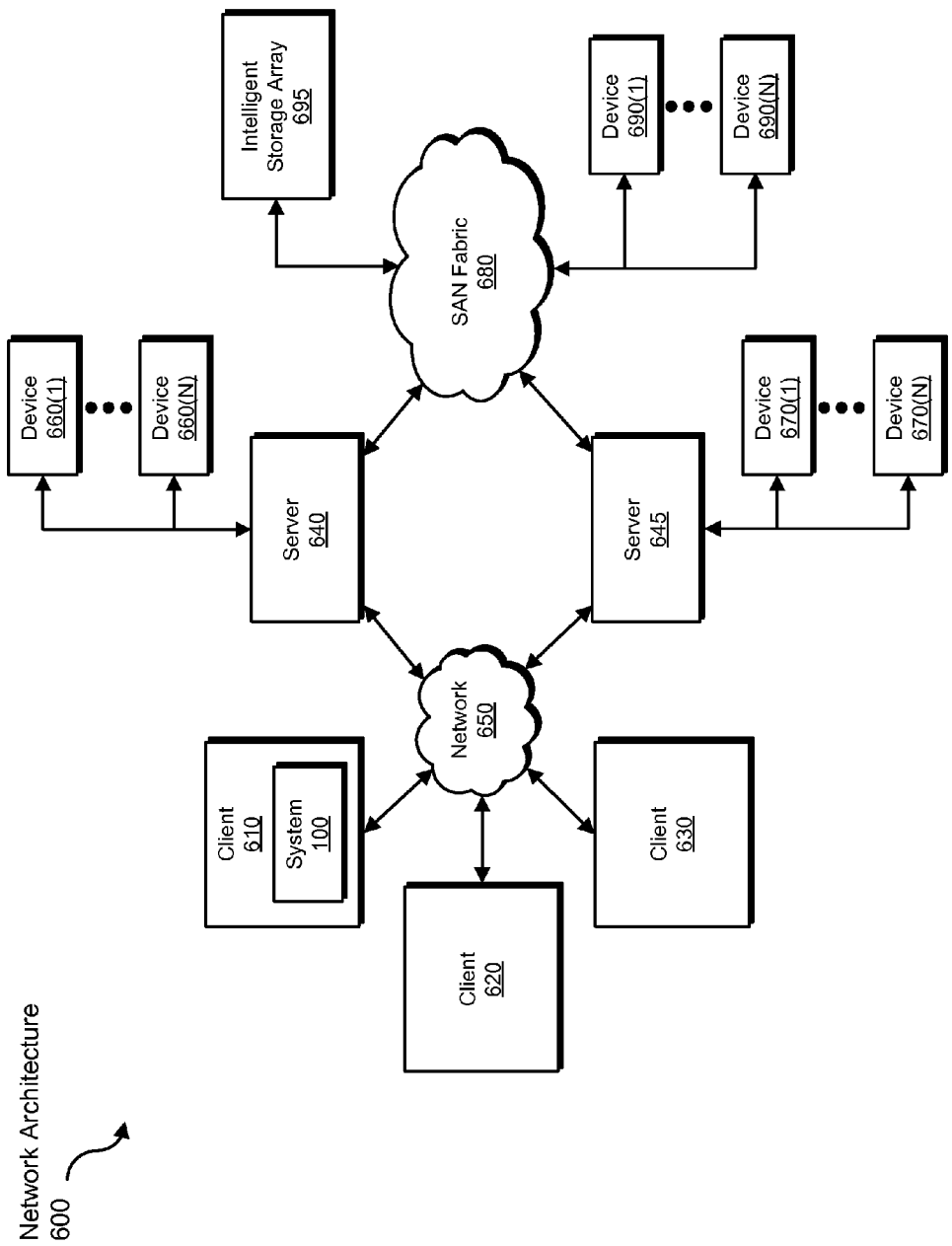
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. Client systems 610, 620, and 630 generally represent any type or form of computing device or system, such as exemplary computing system 510 in FIG. 5. In one example, client system 610 may include system 100 from FIG. 1.

Similarly, servers 640 and 645 generally represent computing devices or systems, such as application servers or database servers, configured to provide various database services and/or run certain software applications. Network 650 generally represents any telecommunication or computer network including, for example, an intranet, a wide area network (WAN), a local area network (LAN), a personal area network (PAN), or the Internet.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as NFS, SMB, or CIFS.

Servers 640 and 645 may also be connected to a storage area network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690 (1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650. Accordingly, network architecture 600 may perform and/or be a means for performing, either alone or in combination with other elements, one or more of the identifying, creating, replacing, adding, including, checking, fixing, removing, and/or restoring steps disclosed herein. Network architecture 600 may also be used to perform and/or be a means for performing other steps and features set forth in the instant disclosure.

As detailed above, computing system 510 and/or one or more components of network architecture 600 may perform and/or be a means for performing, either alone or in combination with other elements, one or more steps of an exemplary method for performing file system checks.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules described herein may transform a computing system into a system for efficiently performing file system checks.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for performing file system checks, at least a portion of the method being performed by a computing device comprising at least one processor, the method comprising:
    identifying a file system to check for validity;
    performing a plurality of incremental checks to validate integrity of the file system, each incremental check in the plurality of incremental checks comprising:
        identifying a base log comprising file system metadata within the file system at a previous time;
        identifying a set of inodes within the file system that have changed since the previous time;
        creating an updated log based on the base log and the set of changed inodes;
        checking the updated log for consistency.

2. The computer-implemented method of claim 1, wherein identifying the base log comprises creating the base log by performing a full file system check on the file system.

3. The computer-implemented method of claim 1, wherein the set of changed inodes comprises at least one of:
    an inode modified since the previous time;
    an inode added since the previous time;
    an inode deleted since the previous time.

4. The computer-implemented method of claim 1, wherein creating the updated log comprises at least one of:
    replacing an inode in the base log with a modified version of the inode in the set of changed nodes;
    adding a new inode to the base log from the set of changed inodes.

5. The computer-implemented method of claim 1, wherein checking the updated log comprises checking whether each directory inode in the set of changed inodes is valid.

6. The computer-implemented method of claim 1, wherein checking the updated log comprises checking for at least one duplicate allocation caused by the set of changed inodes.

7. The computer-implemented method of claim 6, wherein checking for the duplicate allocation comprises at least one of:
    identifying at least one block within the file system that is shared by more than one inode within the set of changed inodes;
    identifying at least one block within the file system that is used by a file of an inode within the set of changed inodes and marked as allocated within the base log.

8. The computer-implemented method of claim 1, wherein checking the updated log comprises checking whether a link count for each inode in the set of changed inodes is valid.

9. The computer-implemented method of claim 1, wherein the file system metadata comprises at least one of:
    structural metadata of the file system at the previous time;
    inodes within the file system at the previous time.

10. The computer-implemented method of claim 9, further comprising:
    identifying current structural metadata of the file system;
    including the current structural metadata in the updated log.

11. The computer-implemented method of claim 10, wherein checking the updated log comprises checking whether the current structural metadata is valid.

12. The computer-implemented method of claim 1, further comprising fixing at least one inconsistency of the file system based on the check of the updated log.

13. The computer-implemented method of claim 12, wherein fixing the inconsistency comprises at least one of:
    removing a file corresponding to a new inode in the set of changed inodes that caused the inconsistency;
    restoring the file system from the base log.

14. A system for performing file system checks, the system comprising:
    a identification module programmed to:
        identify a file system to check for validity;
        perform a plurality of incremental checks to validate integrity of the file system, each incremental check in the plurality of incremental checks comprising:
            identifying a base log comprising file system metadata within the file system at a previous time;
            identifying a set of inodes within the file system that have changed since the previous time;
    an updating module programmed to create an updated log based on the base log and the set of changed inodes;
    a checking module programmed to check the updated log for consistency;
    at least one processor configured to execute the identification module, the updating module, and the checking module.

15. The system of claim 14, wherein the identification module is programmed to identify the base log by creating the base log by performing a full file system check on the file system.

16. The system of claim 14, wherein the set of changed inodes comprises at least one of:
   an inode modified since the previous time;
   an inode added since the previous time;
   an inode deleted since the previous time.

17. The system of claim 14, wherein the updating module is programmed to create the updated log by at least one of:
   replacing an inode in the base log with a modified version of the inode in the set of changed nodes;
   adding a new inode to the base log from the set of changed inodes.

18. The system of claim 14, wherein the checking module is programmed to check the updated log by checking whether each directory inode in the set of changed inodes is valid.

19. The system of claim 14, wherein the checking module is programmed to check the updated log by checking for at least one duplicate allocation caused by the set of changed inodes.

20. A computer-readable-storage medium comprising one or more computer-executable instructions that, when executed by at least one processor of a computing device, cause the computing device to:
   identify a file system to check for validity;
   perform a plurality of incremental checks to validate integrity of the file system, each incremental check in the plurality of incremental checks comprising:
      identifying a base log comprising file system metadata within the file system at a previous time;
      identifying a set of inodes within the file system that have changed since the previous time;
   create an updated log based on the base log and the set of changed inodes;
   check the updated log for consistency.

* * * * *